April 11, 1950 — A. E. HARRISON ET AL — 2,503,266
FREQUENCY STABILIZATION APPARATUS
Filed Aug. 11, 1943 — 2 Sheets-Sheet 1
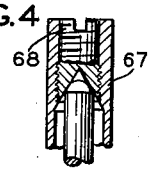
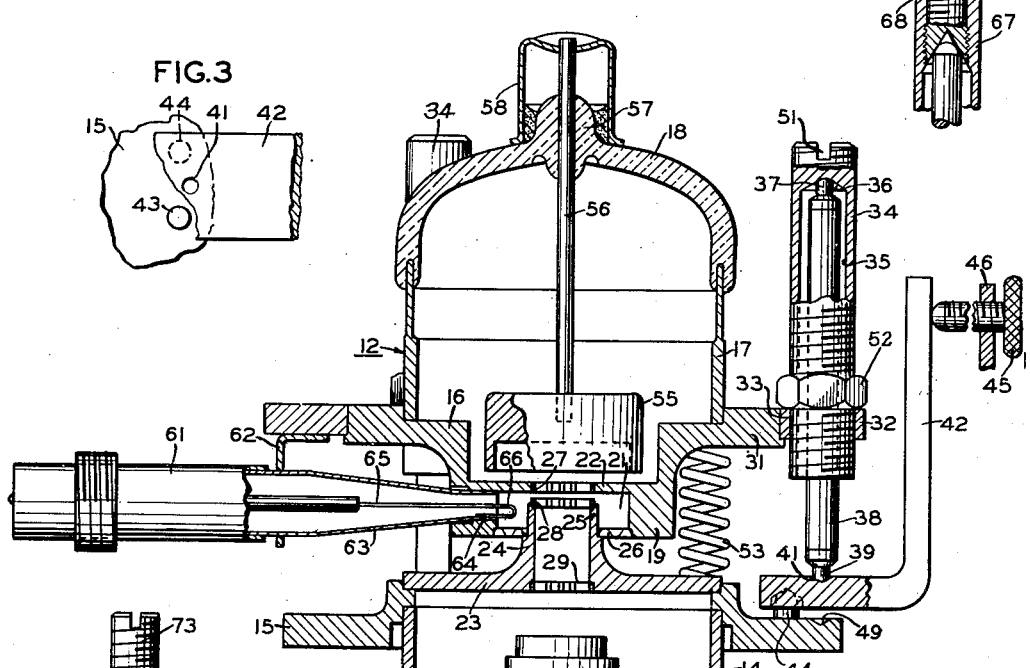
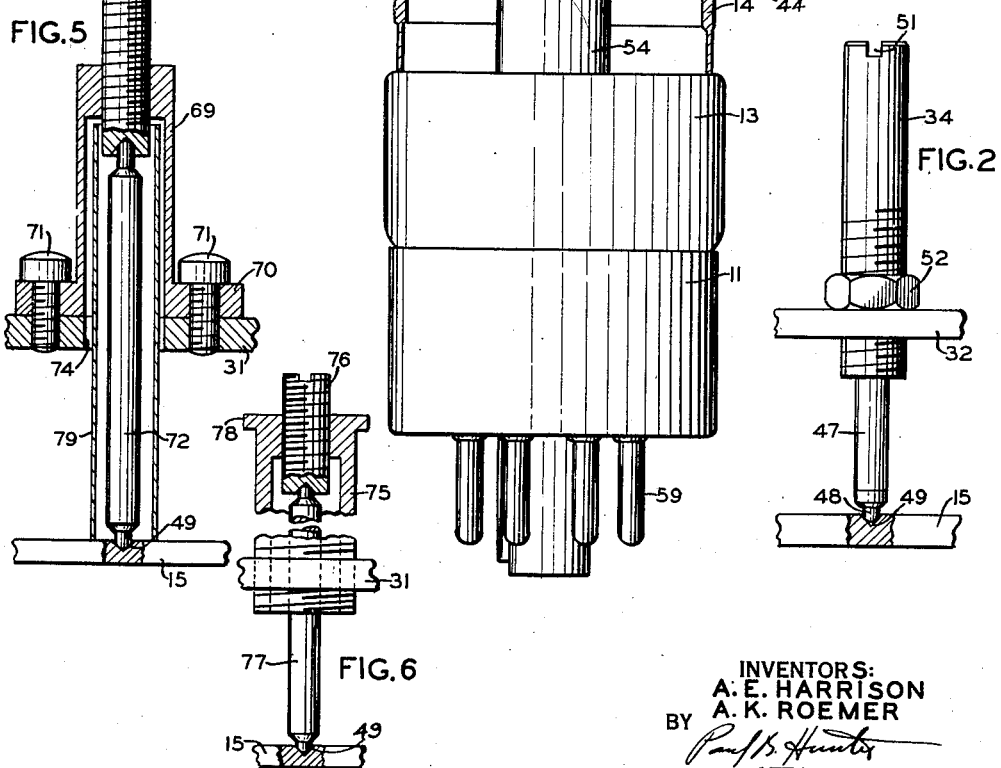
INVENTORS:
A. E. HARRISON
A. K. ROEMER
BY
ATTORNEY April 11, 1950  A. E. HARRISON ET AL  2,503,266
FREQUENCY STABILIZATION APPARATUS
Filed Aug. 11, 1943  2 Sheets-Sheet 2
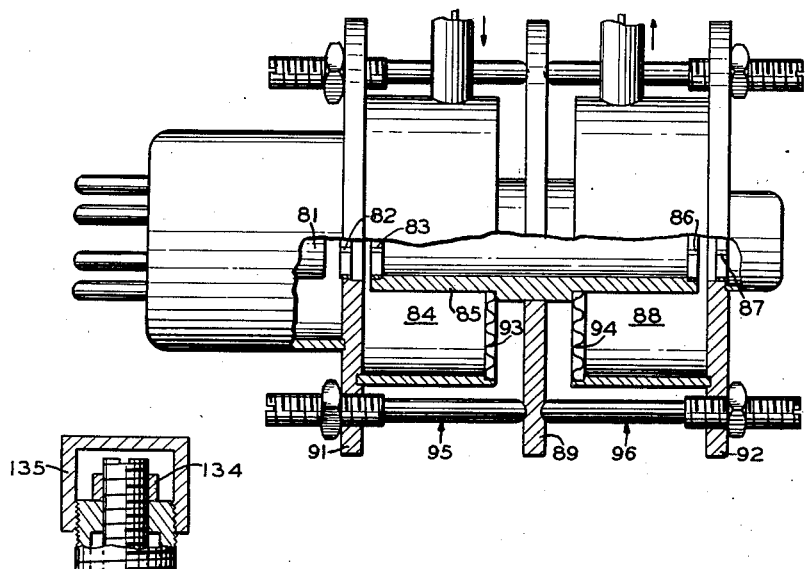
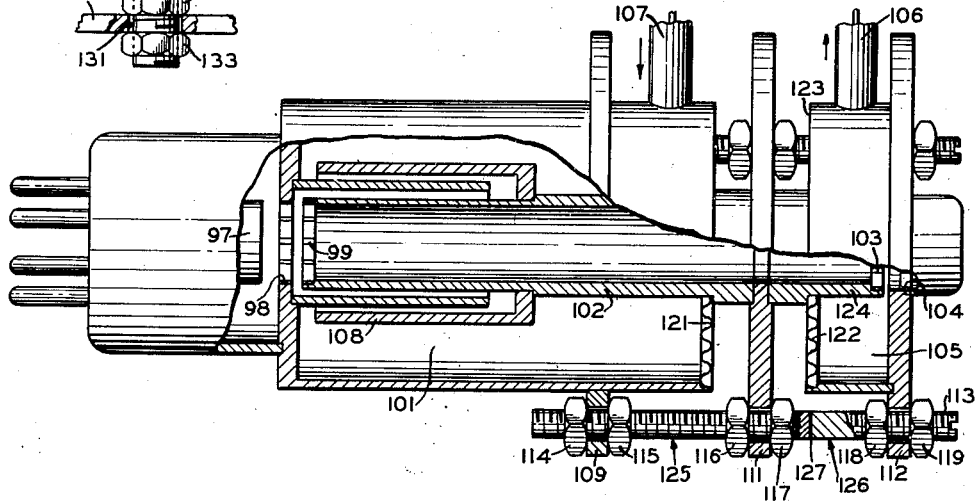
INVENTORS:
A. E. HARRISON
A. K. ROEMER
BY
ATTORNEY Patented Apr. 11, 1950

2,503,266

UNITED STATES PATENT OFFICE 2,503,266

FREQUENCY STABILIZATION APPARATUS

Arthur E. Harrison, Rockville Centre, and Arthur K. Roemer, East Rockaway, N. Y., assignors to The Sperry Corporation, a corporation of Delaware Application August 11, 1943, Serial No. 498,240

22 Claims. (Cl. 315—5)

This invention relates to frequency stabilization apparatus and particularly to hollow resonator devices having special frequency control arrangements.

The invention is peculiarly adaptable to ultra high frequency electron discharge tube structure of the hollow resonator type comprising the preferred embodiment of the invention to be hereinafter described, wherein the resonator or resonators are made with walls of metal or some other conductor which expand or contract with ambient temperature changes and changes in operating temperature of the tube. Where the resonator walls are copper, for example, they expand to increase the volume of the space enclosed thereby and to change the resonator grid spacing. As is known, such changes undesirably alter the natural frequency of the resonant circuit within the resonator correspondingly. This is an obvious decided disadvantage in operation of any hollow resonator device, since it interferes with maintenance of a desired output frequency from the device.

Recognition of this problem and others affecting resonator frequency changes has resulted in many suggestions and arrangements for automatic frequency control of hollow resonator type electron discharge tubes. Many of these have proved successful and operable, but they are mainly relatively complicated and expensive. For example, a known automatic frequency control is disclosed in United States Letters Patent No. 2,294,942. Such arrangements are especially useful for high power tubes, and where the occasion warrants overall frequency control.

Another and simpler method of attacking the problem has been to direct a cooling fluid blast on the tube or resonator during operation. This also involves auxiliary apparatus which is difficult to transport, and which cannot be made part of the tube structure. Further, the blower may be more expensive than the tube. Cooling devices alone do not provide very satisfactory thermal regulation for normal usage. When a cooling blast is applied to the tube during initial operation, the warm-up period is slow. When the blast is applied after a warm-up period, there is always a sudden uncontrolled resultant frequency change.

The present invention contemplates a practical and inexpensive solution of the problem of thermal regulation by building into the tube structure special compensating arrangements automatically opposing and correcting for frequency variations arising from ambient and tube operating temperature variations.

It is therefore a major object of the invention to provide novel arrangements for opposing and compensating for undesired variations or drift in the output frequency of a hollow resonator device arising from variations in ambient and operating temperatures.

A further object of the invention is to provide novel hollow resonator electron discharge tube structure embodying automatic thermally responsive output frequency control arrangements.

It is a further object of the invention to provide novel thermally responsive tuning control and frequency stabilization arrangements for a hollow resonator device.

A further object of the invention is to provide, in a hollow resonator device of the type wherein the resonator volume and grid spacing and natural frequency change in response to variations in ambient and operating temperatures, novel arrangements responsive to said temperature variations for opposing and compensating for the resulting resonator output frequency changes. Pursuant to this object, such arrangements preferably comprise resonator volume and grid spacing control means.

A further object of the invention is to provide novel temperature compensating tuning strut arrangements and construction for a hollow resonator device.

A further object of the invention is to provide novel bimetallic thermal compensation strut construction for hollow resonator devices and the like.

It is a further object of the invention to provide an electron discharge type hollow resonator device with novel arrangements for reducing and compensating for frequency drift arising from ambient and tube operating temperatures, and for improving frequency stabilization of the device when the device is subject to sudden changes in one or both of said temperatures.

A further object of the invention is to provide a hollow resonator device having a plurality of hollow resonators interacting with an electron beam and novel thermally responsive frequency regulation means for maintaining the resonators at or near desired operating frequencies.

A further object of the invention is to provide a novel hollow resonator device having a plurality of hollow resonators of different size interacting with an electron beam and novel thermally responsive frequency regulation means for proportionately maintaining the resonators at or near desired operating frequencies.

Further objects of the invention will presently appear as the description proceeds in connection with the appended claims and the annexed drawings wherein:

Fig. 1 is a side elevation partly in section illustrating the invention as applied to an ultra high frequency electron discharge tube of the hollow resonator type, and showing details of the compensating tuning strut structure as a part of the fine tuning adjustment;

Fig. 2 is a fragmentary elevation illustrating, partly in section, one of the coarse tuning adjustment struts;

Fig. 3 is a fragmentary top plan view further illustrating the fine tuning adjustment;

Fig. 4 is a fragmentary detail illustrating an optional form of adjustable strut construction;

Fig. 5 is a fragmentary view, in elevation and partly in section, illustrating a further embodiment of the tuning strut construction;

Fig. 6 is a fragmentary elevation partly in section, illustrating a further embodiment of the tuning strut construction;

Fig. 7 is a diagrammatic view illustrating the invention as embodied in a multiple hollow resonator device;

Fig. 8 is a diagrammatic view illustrating a further embodiment of the invention as embodied in a multiple hollow resonator device; and Fig. 9 is a fragmentary section in elevation illustrating a further embodiment of the invention.

Referring to Figure 1, the ultra high frequency tube therein illustrated comprises a base 11 to which is secured an evacuated envelope generally designated at 12. Envelope 12 comprises a cylindrical glass or like insulating wall 13 cemented to base 11, a cylindrical metal wall 14 sealed to wall 13, a relatively heavy annular metal flange or plate 15 welded or similarly permanently sealed to wall 14, and a hollow resonator structure 16 welded or similarly permanently sealed to flange 15 and a cylindrical metal wall 17 on the opposite side. The upper end of wall 17 is closed and sealed by a glass or like insulating cap 18.

Resonator structure 16 comprises an integral, conductive, preferably copper, member 19 formed with an internal cylindrical chamber 21 having a rigid end wall 22. An annular metal plate 23, rigidly vacuum sealed to flange 15, is formed with an upstanding tubular boss 24 having a substantially cylindrical end portion serving as a hollow pole or collar 25 extending within chamber 21. Pole 25, together with a flexible annular wall portion or diaphragm 26 extending between pole 25 and member 19 generally parallel to wall 22 comprise the other end wall of chamber 21. Wall portion 26 is preferably an annularly crimped beryllium-copper element soldered or similarly vacuum sealed at its inner and outer peripheries to member 19 and pole 25, so as to provide a fatigue resistant flexible connection therebetween.

Wall 22 is apertured in alignment with pole 25, and spaced parallel resonator grids 27 and 28 are provided in the aperture in wall 22 and the adjacent end of pole 25. An acceleration grid 29 is provided in plate 23 in alignment with grids 27 and 28 and the tube axis. These grids may be of any suitable shape, such for example as shown in United States Letters Patent No. 2,261,154.

Member 19 is formed with an upwardly and outwardly extending radial flange or plate 31 to which is secured an annular flange ring 32. Flange 15 and flange ring 32 are preferably of hardened steel, for good wearing qualities during tuning adjustment to be described.

Flange ring 32 is circumferentially formed with a series of threaded apertures, one of which is designated at 33, having axes parallel to the axis of envelope 12. Preferably three equally spaced apertures 33 are employed. In each aperture 33 is rotatably mounted an externally threaded sleeve 34 closed at its upper end and having a central bore 35 opening toward flange 15.

The closed end of bore 35 of one sleeve 34 is preferably conical at 36 for centering the rounded tip 37 of an elongated tubular rod or member 38. The lower end of rod 38 projects from the open end of sleeve 34 and is formed with a rounded tip 39 seated in a conical depression 41 in the upper surface of a tuning control lever 42. As shown in Figure 1, tips 37 and 39 are separate from the body of rod 38, the tips being hardened elements secured to the rod ends. Sleeve 34 and rod 38 comprise a compound tuning strut. It will also be noted that either sleeve 34 or rod 38 may be termed a connecting member, which is disposed either between the rod 38 or sleeve 34, respectively, and the diaphragm 26. Lever 42 is suitably recessed and fulcrumed upon a spaced pair of hard steel projections 43 and 44 upstanding from flange 15 as shown in Figure 3, for preventing lateral rocking. Controlled movement of lever 42 is obtained through micrometer screw 45 which is threaded in a suitable mount 46 rigid with flange 15, or a suitable tube support or attachment panel. Screw 45 may be suitably calibrated in terms of resonator output frequency.

With reference to Figure 2, which illustrates one of the other tuning struts used in this embodiment of the invention, each sleeve 34 surrounds the upper end of a tubular rod 47 which is similar to but longer than rod 38, and has its rounded lower end 48 seated in a conical depression 49 in flange 15.

As shown in Figure 1, each sleeve 34 is formed at its closed end with a slot 51 or similar tool accommodating formation by which it may be rotated, and a lock-nut 52 is provided for maintaining sleeve 34 in a desired position of axial displacement.

For purposes of the invention, strut sleeves 34 are made of some material which has sufficient mechanical strength to enable them to be securely attached to ring 32, and which has a relatively low coefficient of thermal expansion. For this purpose one of the ferrous alloys known as Invar, Kovar, Nilvar or the like has been found satisfactory, although the use of any sufficiently low thermal expansion metal or alloy is within the scope of the invention. Rods 38 and 47, on the other hand, are made of some alloy or metal having a very high coefficient of thermal expansion, such for example as Duralumin or the like, for a purpose to be explained.

A series of equally spaced tension springs, one of which is shown at 53, are connected between flanges 15 and 31 for association with the tuning struts for opposing separation of the flanges and taking up slack when the flanges are moved toward each other. Preferably three springs are employed, one between each pair of struts.

Within the envelope, a suitably mounted cathode assembly 54 is aligned with the resonator grids for projecting a beam of electrons therethrough, and on the other side of the resonator a cup-shaped reflector electrode 55 is mounted in the beam path. Reflector 55 is supported on the end of a rigid conductor rod 56 extending through a vacuum seal boss 57 in cap 18 for attachment to a metal terminal 58 also secured to cap 18. As is known, terminal 58 provides a manner of applying a negative potential to reflector 55, while base prongs 59 are employed for energization of the other elements within the envelope.

A coaxial conductor output line 61 is supported by an angle 62 fixed to ring 32. The inner end of the outer line conductor is formed with a tapered section 63 terminated in a small diameter cylindrical portion 64 mounted in a suitable aperture in the side wall of resonator chamber 21. The inner line conductor is formed with a reduced section 65 substantially coextensive with the tapered outer conductor, and terminates in a loop 66 within chamber 21.

In operation, a beam of electrons from cathode 54 is velocity modulated by the electromagnetic field within chamber 21 when initially passing between grids 28 and 27, and the velocity grouped beam is returned into the resonator by repulsion of negatively charged electrode 55. According to accepted theories, this operation excites and maintains an ultra-high frequency field interacting with the electron beam within chamber 21, and ultra high frequency energy from that field may be extracted on terminal 61. This theory of operation is known and disclosed in United States Letters Patent No. 2,250,511 to which reference is made for further detail.

The output frequency available at terminal 61 is the frequency of oscillation of the electromagnetic field within chamber 21, which frequency is a function of the volume and shape of chamber 21, and the spacing of grids 27 and 28.

Tuning adjustment of the resonator is accomplished manually by mechanically varying the grid spacing, which also simultaneously varies volume and shape of chamber 21. This is accomplished in coarse adjustment by loosening locknuts 52 and rotatably adjusting sleeves 34. When sleeves 34 are rotated, they are displaced axially toward or away from flange 15. Since rods 38 are rigid, flanges 15 and 31 are thereby separably displaced against or by the tension of springs 53, this displacement being permitted by the flexibility of resonator wall 26 which may be sufficiently resilient to be regarded as a spring auxiliary to springs 33. Pole 25 being rigid with flange 15, and member 19 being rigid with flange 31, the spacing between grids 27 and 28 is accordingly changed and the resonator output frequency varied. When the frequency on line 61 is near that desired, locknuts 52 can be tightened.

Fine tuning is accomplished by rotation of screw 45, motion thereof being transmitted by lever 42 to rod 38. During this fine tuning, the lower ends of other two struts 43, 44 serve as fulcrums.

During operation, the various metal parts of the resonator structure become heated due to increases in the tube operating and ambient temperatures. This causes considerable relative expansion of the resonator parts which if not compensated would result in the above-mentioned undesired and substantially uncontrolled variations in grid spacing and in volume and shape of resonator chamber 21, and resultant undesired and substantially uncontrolled variations in the resonator output frequency.

For example, as the resonator and associated metal parts become more heated, pole 25 becomes hotter than the other resonator walls, and the resultant expansion tends to decrease the resonator grid spacing and correspondingly lower the resonator output frequency. We have observed in tests involving a prior hollow resonator device of the type illustrated in Figure 1, but employing conventional steel tuning struts between flanges 15 and 31, an output frequency decrease drift of about 15 megacycles per second through an ambient temperature rise of about 50° C. Also in such a prior device, after a normal warm-up period to allow the output frequency to become fairly steady, the introduction of a steady cooling blast caused an abrupt rise of about 7 or 8 megacycles per second in the output frequency.

In the present invention, our double-purpose compound tuning struts become heated along with the resonator and other parts. For a given temperature increase, sleeves 34 elongate only a negligible amount, while rods 38 and 47 undergo considerable elongation, springs 53 all the while keeping the rods axially tight with the sleeves. As a result, the effective strut length between flanges 15 and 31 is considerably increased, thereby tending to cause increased separation of grids 27 and 28 and automatic tuning of the resonator to oppose the decreasing output frequency drift of the resonator which is tending to expand in response to the same temperature increase. By this arrangement, the tuning struts automatically effect compensative and corrective resonator tuning control for rendering the resonator output frequency substantially independent of ambient and tube operating temperature variations.

For example, in a test structure similar to Fig. 1, wherein sleeves 34 are of Kovar and rods 38 and 47 of Duralumin, we observed an increase output frequency drift of only about 5 kilocycles per second per degree centigrade, and most of this drift takes place during warm-up. After warm-up, the test structure was subjected to a sudden cooling blast which resulted in a decreasing output frequency change of only about 5 kilocycles per second per degree centigrade. This shows that use of the usual cooling blast contributes to the efficiency of the invention in the test apparatus.

The invention therefore reduces and compensates for frequency drift arising from temperature changes, even during warm-up periods, and also improves the frequency stabilization of the device, even against sudden ambient temperature variations.

The thermal compensation afforded by the struts of the invention is positive and immediate in action, being responsive to the same condition which tends to cause the undesired frequency drift, and renders operation of the device substantially independent of the temperature of its surroundings.

Almost any compensative action of the struts may be obtained by proper selection of materials for the sleeves and rods, and by selection of their relative lengths. The particular compound strut structure above described is advantageous and compact in that it enables a relatively long, high thermal expansion rod to be employed between the rather closely spaced flanges 15 and 31.

Since sleeve 34 is in effect an adjustable extension of flange 31, sleeve 34 may be made rigid or integral with ring 31. In constructions where the strut sleeve may be an integral or non-adjustable extension of flange 31 or ring 32, as shown in Figure 4, such a sleeve 67 may be provided with a small axial adjustment for coarse tuning or the like comprising rotatable end plug 68 threadedly mounted in the upper end of sleeve 67 and formed with a screw driver or like slot for adjustment.

Figure 5 illustrates a further embodiment of the invention wherein each compound tuning strut comprises a Kovar or like sleeve 69 brazed or similarly fixed to a plate 70 which in turn is fastened to flange 31 as by bolts 71. Since no bearing or similar wear is effective on flange 31 during tuning, no special wear flange ring 32 is needed as in Fig. 1.

A tubular rod 72, preferably of Duralumin and similar to rod 47, is mounted concentric with sleeve 69. At its upper end rod 72 is centered within the recessed end of a screw 73 which is threadedly mounted within sleeve 69 as illustrated. Screw 73 is formed with a suitable tool slotted head for enabling axial adjustment. Rod 72 passes freely through a suitable aperture 74 in flange 31, and its lower end is centered in depression 49 on flange 15. The strut of this embodiment of the invention which bears on lever 42, instead of directly on flange 15, is arranged therewith similarly to Figure 1.

The thermal compensation and tuning operation and function of the device of Figure 5 is substantially the same as that of Figure 1. Rotation of screws 73 accomplish coarse tuning, and the large thermal expansion of rods 72 accomplishes compensating tuning for reducing and substantially eliminating frequency drift due to temperature variations.

Figure 5 also illustrates an arrangement for limiting effective shortening of the strut when ambient temperatures drop below a predetermined value. This comprises the provision of a hollow sleeve 79 within sleeve 69 and surrounding rod 72. Sleeve 79 loosely rests on flange 15 and passes freely through aperture 74, and terminates just short of the closed end of sleeve 69 as illustrated. Sleeve 79 is so composed that it has substantially the same high coefficient of thermal expansion as the strut for temperatures above a selected value, and has a far lower coefficient of thermal expansion for temperatures below the selected value. Sleeve 79 may be made of any alloy or combination of metals for accomplishing this function.

During operation above the selected temperature limit, sleeve 79 has no effect on the thermal compensation action of the strut above described. However, when the ambient temperature reaches the selected low value, sleeve 79 ceases to contract further, or contracts far slower than rod 72 with each degree drop in temperature. Sleeve 79 thus contracts in length slower than the strut, and a condition is soon reached, determined by the thermal characteristics of the parts and the distance between the upper end of sleeve 79 and the closed end of sleeve 69, where sleeve 79 is in solid abutment with the closed end of sleeve 69 and thereafter halts further effective shortening of the strut regardless of the temperature drop.

As an example of a use of this feature of the invention, sleeve 79 is so designed as not to interfere with thermal compensation of the strut during temperature changes between 0° C. and any upper limit, but is designed to stop strut contraction soon after the temperature drops below 0° C. as desired. In this manner, for example undesired drops of three to four megacycles per second in frequency of a resonator device like that of Figure 1 are prevented when the ambient temperature falls to operating conditions approaching −40° C.

The same result may be accomplished if desired by choosing either the rod 72 and the screw 73 or both of materials which will accomplish the function of sleeve 79 by slowing or stopping strut contraction at the selected low temperature, such a compound strut probably having an exponential or like varying temperature response.

Figure 6 illustrates a further embodiment of the invention similar to those above described but wherein provision is made for regulating the effective length ratio of the high- and low thermal expansion parts of the tuning strut. Here each compound strut comprises a sleeve 75 rotatably mounted in aperture 33 of flange 31. Sleeve 75 is similar to sleeve 34 but has its upper end formed with an axially threaded bore similarly to Figure 5, for rotatably mounting an axially adjustable threaded strut section 76 extending within sleeve 75 as illustrated. A strut rod 77 of Duralumin or the like extends between the recessed lower end of section 76 and flange depression 49. If desired sleeve 75 may be formed with a knurled head 78 for ease in adjustment.

Strut section 76 is preferably made of a hard material, such as stainless steel, having good wear qualities for adjustment and having high thermal expansion properties. Strut rod 77 and the adjacent portion of strut section 76 projecting inwardly from the threaded end of sleeve 75 form a high thermal expansion strut portion which is adjustable in effective length and in its frequency compensation function by adjustment of section 76.

As illustrated in Figure 7, the invention may be applied to multiple hollow resonator devices such for example as those illustrated in United States Letters Patent No. 2,311,658. In Figure 7, an electron beam from cathode 81 is projected through spaced grids 82, 83 of input hollow resonator 84, along drift passage 85, and then through spaced grids 86, 87 of output hollow resonator 88. A radial flange 89, rigid with drift tube 85, is parallel and partly coextensive with similar flanges 91 and 92 rigid with resonators 84 and 88. Drift tube 85 is flexibly connected to resonators 84 and 88, as by flexible end walls 93 and 94 on the respective resonators.

A plurality of equally spaced compound thermal compensating tuning struts, indicated at 95 and 96, are interposed between flange 89 and flanges 91 and 92 respectively. Struts 95 and 96 are preferably of the same construction and operation as those shown in Figures 2, 5, or 6 and above described in detail. Biasing springs similar to those at 53 in Figure 1, but not shown in Fig. 7, are also employed.

In this embodiment of the invention, the respective resonator frequencies are separately compensated by independent strut operation. Since it is often difficult to make two resonators exactly alike, and since heat input to the different resonators may not always be equal, the invention contemplates selection of strut dimensions and material suited to associated resonator characteristics. This embodiment may be equally well applied to devices having more than two resonators, such as buffer oscillators, and to frequency multipliers where the resonators are of appreciably different size as in Figure 8.

Referring to Figure 8, an electron beam from cathode 97 is projected through spaced grids 98, 99 of input resonator 101, along drift tube 102 and through spaced grids 103, 104 of output resonator 105. Resonator 101 is larger than 105, preferably to such extent that the output frequency extracted on line 106 is a harmonic of the frequency introduced on line 107. A relatively high capacitative connection indicated at 108 between the input grids enables the physical size of resonator 101 to be appreciably reduced. The general operation of frequency multipliers is known and described in United States Letters Patent No. 2,281,935.

Parallel partly coextensive radial flanges 109, 111 and 112 are provided rigid with resonator 101, tube 102 and resonator 105, respectively. These flanges are formed with a plurality of equally spaced apertures through each of which freely passes a long threaded member or strut 113. Threaded on member 113 on opposite sides of each flange are spaced nut pairs 114 and 115, 116 and 117, and 118 and 119 as illustrated. Tube 102 is displaceably connected to resonators 101 and 105, as by flexible resonator end walls 121, 122, so that suitable manual adjustment of member 113 and the associated nut pairs can be employed to manually accomplish almost any desired tuning adjustment of the resonators.

The foregoing described structure of Figure 8 does not comprise part of our invention. Our invention herein resides in accomplishing thermally responsive compensative frequency regulation of the device of Figure 8. To this end we make the rigid walls 123 and reentrant pole 124 of resonator 105 of Kovar or some other material having a very low coefficient of thermal expansion, resonator 101 being made as usual wholly of copper which has a much higher coefficient of thermal expansion than Kovar.

Tuning strut member 113 is a compound strut, being made of a high thermal expansion section 125 at the end adjacent resonator 101, and a rigidly joined low thermal expansion section 126 at the end adjacent resonator 105. Section 126 is preferably of Nilvar or Kovar, while section 125 is made of stainless steel.

As illustrated in Figure 8, we have found it desirable to make high thermal expansion section 125 long enough to extend materially past intermediate flange 111, sections 125 and 126 being brazed together as at 127.

During operation, variations in ambient and tube operating temperatures tend to change one or both resonator operating frequencies. These temperature variations also cause expansion of strut 113, but the greater part of strut section 125 between nuts 115 and 116 which is mainly effective to regulate tuning of resonator 101 elongates at a greater rate per unit increase in temperature than does the strut section made up of a short part of section 125 and section 126 between nuts 117 and 118. Thus the spacing of grids 98, 99 is automatically differentially regulated with respect to the spacing of output grids 103, 104, so that a desired frequency multiplication ratio between the resonators is substantially maintained. Any desired result may be obtained by suitable selection of materials and section dimensions for strut 113.

The reason for making the body of resonator 105 of low thermal expansion material is to reduce the absolute expansion and output grid separation of resonator 105. If resonator 105 is made of the same high thermal expansion material as resonator 101, for example, the resultant expansion of resonator 105 per degree increase in temperature would be too great proportionately to the corresponding expansion of resonator 101 to maintain the desired frequency multiplication ratio by the simple arrangement above described. By making resonator 105 of low thermal expansion material, grid spacing 103, 104 and the resonator volume are caused to respond to temperature variations in desired proportion to the spacing of grids 98, 99 and the volume of resonator 101.

Obviously strut sections 125 and 126 may each be replaced by further compound strut sections similar to Figure 2 and suitably designed to obtain the above described differential thermal response while at the same time maintaining each individual resonator frequency at or near a desired absolute value.

Figure 9 illustrates a further embodiment of our compound thermal strut applied to the hollow resonator device of Figure 1. A sleeve 128 of Kovar or the like is threadedly mounted in apertured flange 31 with open end facing flange 15. A threaded rod 129 of Duralumin or like high thermal expansion material is threadedly supported in the closed end of sleeve and passes freely through aperture 131 in flange 15. Suitable lock nuts 132 and 133 are mounted on rod 129 on opposite sides of flange 15, for coarse tuning adjustment. Another locknut 134 is provided on rod 129 above sleeve 128 for altering the effective strut length, and nut 134 in protected by a cap 135. A lock nut 136, similar to nut 52 in Figure 1, holds the sleeve in axial adjustment on flange 31.

In operation, the compound strut of Figure 9 functions similarly to that of Figure 1, except that in Figure 9 the strut positively accomplishes tuning in both directions, instead of having a resilient bias in one direction as in Figure 1. Any desired number of the struts of Figure 9 may be arranged around the resonator as in Figure 1. The arrangements of Figures 1 to 9 may all be interchanged to suit the different structures without departing from the spirit of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. High frequency electron discharge tube structure, comprising tunable hollow resonator means including a pair of spaced relatively movable wall portions and subject to undesired changes in operating frequency when exposed to variations in ambient and tube operating temperatures; resonator tuning strut means connected between said wall portions for automatically reducing said undesired frequency changes, said tuning strut means comprising consecutive sections including a sleeve member having a relatively low coefficient of thermal expansion carried by one of said wall portions and a rod member having a relatively high coefficient of thermal expansion coaxially disposed within and extending between said sleeve member and the other of said wall portions; and means including an adjustable connection between one end of said sleeve member and said one wall portion and adjustable coupling means between the other end of said sleeve member and the adjacent end of said rod member for altering the length ratio of said sleeve and rod members without changing the spacing between said wall portions; whereby compensation of said undesired thermal effects may be accomplished independently of the tuning of said resonator.

2. High frequency apparatus comprising a hollow resonator having wall portions relatively movable for tuning of said resonator, a tuning strut mounted exteriorly of and operably interconnecting said wall portions, said strut comprising a plurality of members two of which have widely different coefficients of thermal expansion, and means on one of said wall portions for adjusting the effective length of the member having the higher coefficient of thermal expansion for altering the amount of thermal compensation independently of the tuning of said resonator.

3. High frequency electron discharge tube structure embodying a hollow resonator having relatively movable electron permeable wall portions and annular flange means rigid with each of said wall portions and disposed exteriorly of said resonator, one of said flange means having a threaded aperture, means for projecting an electron beam through said walls, and a thermal-compensation tuning strut operably connected between said flange means comprising an externally threaded tubular member secured to said apertured flange means and a rod member operably connected between said tubular member and the other of said flange means, said members having widely different coefficients of thermal expansion, whereby compensation of undesired thermal effects is accomplished.

4. High frequency electron discharge tube structure embodying a hollow resonator having relatively movable electron permeable wall portions, means for projecting an electron beam through said walls, and a thermal-compensation tuning strut operably connected between said wall portions exteriorly thereof, comprising a first member in said strut having a relatively low coefficient of thermal expansion adjustably secured to one of said wall portions, and a second member in said strut having a relatively high coefficient of thermal expansion adjustably connected between said first member and said other wall portion to vary the effective length of said second member whereby the amount of thermal compensation is independent of the tuning of said resonator.

5. High frequency apparatus comprising a hollow resonator having relatively movable wall portions for tuning said resonator, radial extensions of said wall portions, a tuning strut sleeve threadedly mounted on one of said extensions to vary the effective length of said sleeve, said sleeve having an open end facing the other extension and means closing the opposite end, a tuning strut rod surrounded in part by said sleeve and reacting at opposite ends between said closed sleeve end and said other extension, and resilient means interconnecting said extensions, whereby compensation of undesired thermal effects is automatically provided independently of the tuning of said resonator.

6. The apparatus defined in claim 5, wherein said sleeve has a relatively low coefficient of thermal expansion, and said rod adjustably engages said closed end and has a relatively high coefficient of expansion.

7. The apparatus defined in claim 5, wherein said closing means comprises a closed end having a recess on the inner face thereof and said rod has relatively hard bearing surfaces at the ends thereof, one of said surfaces being seated within said recess and the other bearing directly on said other extension.

8. The apparatus defined in claim 5, including means for locking said sleeve in a desired position of axial displacement on said one extension.

9. High frequency tube structure comprising a hollow resonator having flexibly interconnected wall portions located in adjacent relation, an extension of one wall projecting away from the other wall portion and having a terminal part located a substantial distance away from said other wall portion, and a compensative elongated high thermal expansion member extending between said terminal part and said other wall portion, whereby compensation of spurious thermal effects is provided.

10. The structure defined in claim 9, wherein said extension is a tubular member and the terminal part is a closed end thereof, said closed end having an inwardly disposed recess, wherein said elongated member is seated, said tubular member also having an open end in threaded engagement with said one wall and having considerably lower thermal expansion properties than said member.

11. High frequency tube structure comprising a pair of spaced tuning members, means resiliently interconnecting said members, a compound tuning strut between said members, adjustable means for adjusting the effective length of said strut, and a pair of motion transmitting elements in said strut, said elements comprising a hollow sleeve of relatively low thermal expansion properties rotatably adjustable in one of said members for accomplishing said adjustment of the effective strut length, and a thermal-compensative rod partly coextensive with said sleeve operably connected between said sleeve and said other member, whereby compensation of spurious thermal effects is provided.

12. In a high frequency electron discharge tube device wherein a cavity resonator is provided with a pair of relatively movable wall portions for controlling the operating frequency of the device, and wherein the wall portions are formed with substantially parallel flanges extending outwardly from said resonator, the combination comprising a thermal-compensation tuning strut for compensatively controlling the frequency of the device, said tuning strut comprising a low-thermal-expansion sleeve connected to one of said flange members and a strut inner-section having a plurality of successive members extending within said sleeve and having relatively high coefficients of thermal expansion, adjacent ones of said successive members being adjustable for varying the thermal-sensitive length of said strut section, whereby the resultant frequency compensative control of said strut section may be varied.

13. A compound thermal-compensation tuning strut adapted to be disposed between a pair of substantially parallel, resiliently interconnected support members, comprising a relatively low-thermal-expansion-coefficient sleeve member having an open end and closure means closing the opposite end, said closure means having a recess formed therein providing a low friction bearing surface, a relatively high-thermal-expansion-coefficient compensative strut rod partly enclosed within said sleeve member and having an exposed portion thereof extending outwardly of said sleeve member and means on said sleeve member adjacent said open end adapted to secure said sleeve to one of the support members with said strut rod extending toward the other support member, said rod having oppositely disposed, substantially rounded end portions, one end portion being seated in said recess and the other end portion adapted to engage said other support member, whereby any tendency of the support members to be relatively displaced due to dimensional changes thereof caused by variation in temperature is substantially overcome by a compensatory alteration in the length of said strut rod in accordance with said temperature variation.

14. High frequency tube structure comprising a pair of spaced tuning members, means resiliently interconnecting said members, and a compound thermal-compensation tuning strut between said members, said tuning strut comprising a relatively low-thermal-expansion-coefficient sleeve member having an open end and closure means closing the opposite end, said closure means having a recess formed therein providing a low friction bearing surface, a relatively high-thermal-expansion-coefficient strut rod partly enclosed within said sleeve member and with an exposed portion thereof extending outwardly of said sleeve member, and means on said sleeve member adjacent said open end for securing said sleeve to one of the tuning members with said strut rod extending toward the other tuning member, said rod having oppositely disposed, substantially rounded ends, one end being seated in said recess and the other end engaging said other tuning member, whereby any tendency of the tuning members to be relatively displaced due to temperature variations is substantially overcome by a compensatory alteration in the length of said strut rod in accordance with said temperature variation.

15. High frequency apparatus comprising hollow resonator means subject to undesired changes in operating frequency when exposed to variations in ambient operating temperatures, compensating means in said apparatus for automatically reducing said undesired frequency changes, and means in said compensating means for limiting operation of said compensating means.

16. In high frequency tube structure embodying hollow resonator means, tuning means for said resonator means comprising a pair of spaced members interconnected by a tuning strut, means controlling the elongation of said strut in response to temperature changes, and means limiting contraction of said strut below a selected temperature.

17. In combination with an ultra-high frequency tuning cavity having a movable diaphragm, means for compensating for temperature variations so as to maintain the resonant frequency of said cavity substantially constant, comprising a temperature-responsive expansible and contractible member mounted on the cavity structure externally thereof, and a connecting element between said member and the movable diaphragm, whereby the latter is moved in response to expansion or contraction of said member.

18. In combination with an ultra-high-frequency cavity resonator having a movable diaphragm and wall portions, means for compensating for temperature variations to maintain the resonant frequency of said cavity resonator substantially constant, comprising a thermal-compensation expansible and contractible member mounted on said wall portions externally thereof to automatically reduce any undesired frequency changes of said cavity resonator, and stop means associated with said member for preventing the effective operation thereof beyond a predetermined point.

19. In combination with an ultra-high-frequency cavity resonator having wall portions including a movable diaphragm, and flanges connected to said wall portions, a compound thermal-compensation tuning strut at least partially between said flanges, said tuning strut comprising a relatively low-thermal-expansion coefficient sleeve member, and supporting means for adjustably mounting said sleeve on one of said flanges, a relatively high-thermal-expansion-coefficient strut rod partly enclosed within said sleeve member, means on said sleeve member for securing said sleeve to one of said flanges, said rod having oppositely disposed, substantially rounded ends, one end being seated in said supporting means and the other engaging one of said flanges, and sleeve means concentric with said rod and located intermediate said rod and said sleeve to limit the reduction in the spatial separation of said flanges beyond a predetermined point, whereby compensation of undesired thermal effects is automatically provided.

20. An electron discharge device having a hollow body resonator with a fixed end wall, said resonator having a movable collar as a part thereof, said collar having an end thereof within the resonator spaced from and opposing a part the fixed wall of said resonator and forming thereby a constriction, said collar having an end external of the resonator, plates respectively carrying said external end of the collar and said fixed part of the resonator, springs coupling and tending to draw said plates together and lessen the spacing between said fixed part of the resonator and the collar, and struts secured to one of said plates opposing the spring action and keeping said fixed part and collar spaced, said struts having greater coefficient of expansion than said collar and automatically compensating for expansion of the collar due to heat in use and thereby maintaining the said spacing between said fixed part and the collar substantially constant under varying heat conditions encountered in use of the device.

21. An electron discharge device having a hollow body resonator with a fixed end wall, said resonator having a movable collar as a part thereof, said collar having an end thereof within the resonator spaced from and opposing a part of the fixed wall of said resonator and forming thereby a constriction, said collar having an end external of the resonator, plates respectively carrying said external end of the collar and said fixed part of the resonator, springs coupling and tending to draw said plates together and lessen the spacing between said fixed part of the resonator and the collar, struts secured to one of said plates opposing the spring action and keeping said fixed part and collar spaced, said struts having greater coefficient of expansion than said collar and automatically compensating for expansion of the collar due to heat in use and thereby maintaining the said spacing between said fixed part and the collar substantially constant under varying heat conditions encountered in use of the device, and a tuning control under one of said struts for shifting said collar irrespective of the continued functioning of the strut as an automatic temperature compensation.

22. An electron discharge device having a hollow body resonator with a fixed end wall, said resonator having a movable collar as a part thereof, said collar having an end thereof within the resonator spaced from and opposing a part of the fixed wall of said resonator and forming thereby a constriction, said collar having an end external of the resonator, plates respectively carrying said external end of the collar and said fixed part of the resonator, springs coupling and tending to draw said plates together and lessen the spacing between said fixed part of the resonator and the collar, struts secured to one of said plates opposing the spring action and keeping said fixed part and collar spaced, said struts having greater coefficient of expansion than said collar and automatically compensating for expansion of the collar due to heat in use and thereby maintaining the said spacing between said fixed part and the collar substantially constant under varying heat conditions encountered in use of the device, and a tuning lever hinged to the said plate carrying said collar, said lever underlying an end of one strut for prying thereagainst and thereby shifting said collar irrespective of the continued functioning of the strut as an automatic temperature compensation.

ARTHUR E. HARRISON.
ARTHUR K. ROEMER.

REFERENCES CITED

The following references are of record in the file of this patent:

UNITED STATES PATENTS

| Number | Name | Date |
|---|---|---|
| 1,913,978 | Ewen | June 13, 1933 |
| 2,095,981 | Hansell | Oct. 19, 1937 |
| 2,109,880 | Dow | Mar. 1, 1938 |
| 2,134,794 | Muth | Nov. 1, 1938 |
| 2,142,630 | Conklin | Jan. 3, 1939 |
| 2,183,215 | Dow | Dec. 12, 1939 |
| 2,251,085 | Unk | July 29, 1941 |
| 2,374,810 | Fremlin | May 1, 1945 |
| 2,414,785 | Harrison et al. | Jan. 21, 1947 |
| 2,418,844 | Le Van | Apr. 15, 1947 |

FOREIGN PATENTS

| Number | Country | Date |
|---|---|---|
| 422,869 | Great Britain | Jan. 21, 1935 |

Certificate of Correction

Patent No. 2,503,266

April 11, 1950

ARTHUR E. HARRISON ET AL.

It is hereby certified that errors appear in the printed specification of the above numbered patent requiring correction as follows:

Column 4, line 30, after "other" insert the word *two*; column 10, line 21, for "in" before "protected" read *is*; column 13, line 36, after "ambient" insert *and*; column 14, line 24, after "part" insert *of*;

and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*